United States Patent [19]
Mase et al.

[11] Patent Number: 5,688,215
[45] Date of Patent: Nov. 18, 1997

[54] TOOL MAGAZINE FOR MACHINE TOOL

[75] Inventors: Yoshiaki Mase, Hozumi-Cho; Yukihiro Sakakibara, Handa; Norimitsu Araki, Yokkaichi, all of Japan

[73] Assignee: Howa Machinery, Ltd., Nagoya, Japan

[21] Appl. No.: 631,657

[22] Filed: Apr. 2, 1996

[30] Foreign Application Priority Data

Apr. 7, 1995 [JP] Japan ................... 7-108128

[51] Int. Cl.$^6$ .................................. B23Q 3/157
[52] U.S. Cl. .................... 483/66; 211/1.55; 211/70.6
[58] Field of Search .................... 483/66, 67, 68, 483/58, 59, 65; 211/1.51, 1.52, 1.53, 1.55, 1.56, 70.6

[56] References Cited

U.S. PATENT DOCUMENTS

| 3,817,391 | 6/1974 | Lohneis et al. | 211/1.56 |
| 4,117,586 | 10/1978 | Uchida et al. | 483/68 X |

FOREIGN PATENT DOCUMENTS

| 181536 | 10/1983 | Japan | 483/68 |
| 6-246572 | 9/1994 | Japan . | |

Primary Examiner—William R. Briggs
Attorney, Agent, or Firm—Ladas & Parry

[57] ABSTRACT

A tool magazine disclosed is fundamentally the same in construction as a corresponding prior art tool magazine but is capable of handling tools of diameters greater than those of tools which can be handled by the prior art tool magazine. The tool magazine comprise a magazine body provided with an endless guide groove, and a plurality of tool pots each for holding a tool, fixedly provided with guide members engaging the endless guide groove for sliding movement along the guide groove. Idlers are disposed between and in contact with adjacent tool pots, respectively, and supported in the endless guide groove so as to move along the endless guide groove. A feed mechanism moves the tool pots and the idlers along the endless guide groove with the idlers in contact with the guide members of the adjacent tool pots, respectively. The idlers are substantially the same in shape and dimensions as the guide members. The surface of each guide member is coated with an abrasion-resistant film having a small coefficient of dynamic friction.

5 Claims, 7 Drawing Sheets

TOOL MAGAZINE FOR MACHINE TOOL

BACKGROUND OF THE INVENTION

1. Field of the Invention

The present invention relates to a tool magazine to be mounted on a machine tool.

2. Description of the Related Art

A known tool magazine proposed in JP-A-6-246572 (laid open on Sep. 6, 1994) has tool pots, a tool pot guide mechanism is constructed by attaching a pair of support rods to the upper surface of each tool pot, fixing a head member and a contact member, which is in contact with adjacent tool pots, to each pair of support rods, and rotatably supporting a guide roller (bearing) and an engagement roller, which engages with a sprocket of a feed mechanism, on each pair of support rods. The tool pot guides are fitted in an endless guide groove having vertical guide surfaces and horizontal guide surfaces with the head members seated on the horizontal guide surfaces, the guide rollers in rolling contact with the vertical guide surfaces, and the adjacent tool pots in contact with each other. The tool pots roll as they are moved along the guide groove.

A machining center incorporating this known tool magazine was developed to machine steel workpieces by using tools of tool diameters not greater than 53 mm, i.e., tool diameters smaller than the outside diameter of the tool pots. When machining workpieces of light alloys on the machining center, tools of tool diameters greater than 53 mm, for example 75 mm, must be used because the amount of chips increases when workpieces of light alloys are machined by using tools of tool diameters not greater than 53 mm. The pitch of the tool pots of the foregoing known tool magazine is determined or designed on condition that the tool diameters of the tools are 53 mm and, therefore, the known tool magazine is unable to handle tools of 75 mm in tool diameter. Since the tool pots of the known tool magazine are rollingly guided along the guide groove, the guide rollers must be rotatably supported, which increases the cost. The guide mechanism for guiding each tool pot is constructed by assembling a comparatively large number of parts including the head member, the guide roller, the contact member and the engagement roller and hence the same is costly.

SUMMARY OF THE INVENTION

Accordingly, it is an object of the present invention to provide a tool magazine having a construction fundamentally similar to that of the aforesaid known tool magazine but capable of handling tools of diameters which could not have been handled by the aforesaid known tool magazine.

According to the present invention, a tool magazine to be used in combination with a machine tool comprises: a magazine body provided with an endless guide groove; a plurality of tool pots each for holding a tool, fixedly provided with guide members engaging the endless guide groove for sliding movement along the guide groove; idlers disposed between and in contact with adjacent tool pots, respectively, and supported in the endless guide groove so as to move along the endless guide groove; and a feed mechanism for moving the tool pots and the idlers along the endless guide groove with the idlers in contact with the guide members of the adjacent tool pots, respectively.

The endless guide groove may have horizontal guide surfaces and vertical guide surfaces, each tool pot may be provided with two guide members each having a head portion in sliding contact with the horizontal guide surfaces of the endless guide groove, a guided portion in sliding contact with the vertical guide surfaces of the endless guide groove, and a contact portion in contact with contact portions of adjacent guide members, and the idlers are substantially identical in shape and dimensions with the guide members.

Further, the guide member may be an integral member having the head portion, the guided portion and the contact portion, and at least either the surface of each guide member or that of the guide groove may be coated with a film that enables each guide member to slide along the guide groove.

The film coating at least either the surface of each guide member or that of the guide groove is preferably a nickel film containing fine particles and formed by electroless plating.

The film coating on either the surface of the guide member or that of the guide groove is preferably a polytetrafluoroethylene film.

The idlers interposed between adjacent tool pots increases the pitch of the tool pots to enable the tool pots to hold tools of increased diameters which could not have been held by the tool pots of the aforesaid known tool magazine. The vertical guide surfaces of the endless guide groove serve to guide the guided portions of the guide members so that the guide members slide along the vertical guide surfaces, each contact portion is in contact with an idler adjacent to the tool port, and the tool pots slide along the endless guide groove.

The above and other objects, features and advantages of the present invention will become more apparent from the following description taken in connection with the accompanying drawings.

DETAILED DESCRIPTION OF THE PREFERRED EMBODIMENTS

Figure 1:
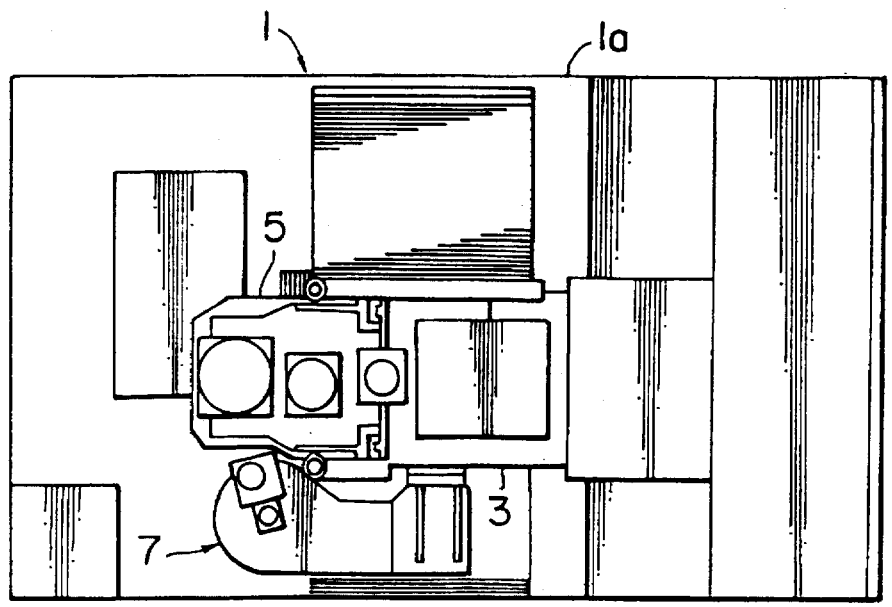
FIG. 1 is a plan view of a machining center.
Figure 2:
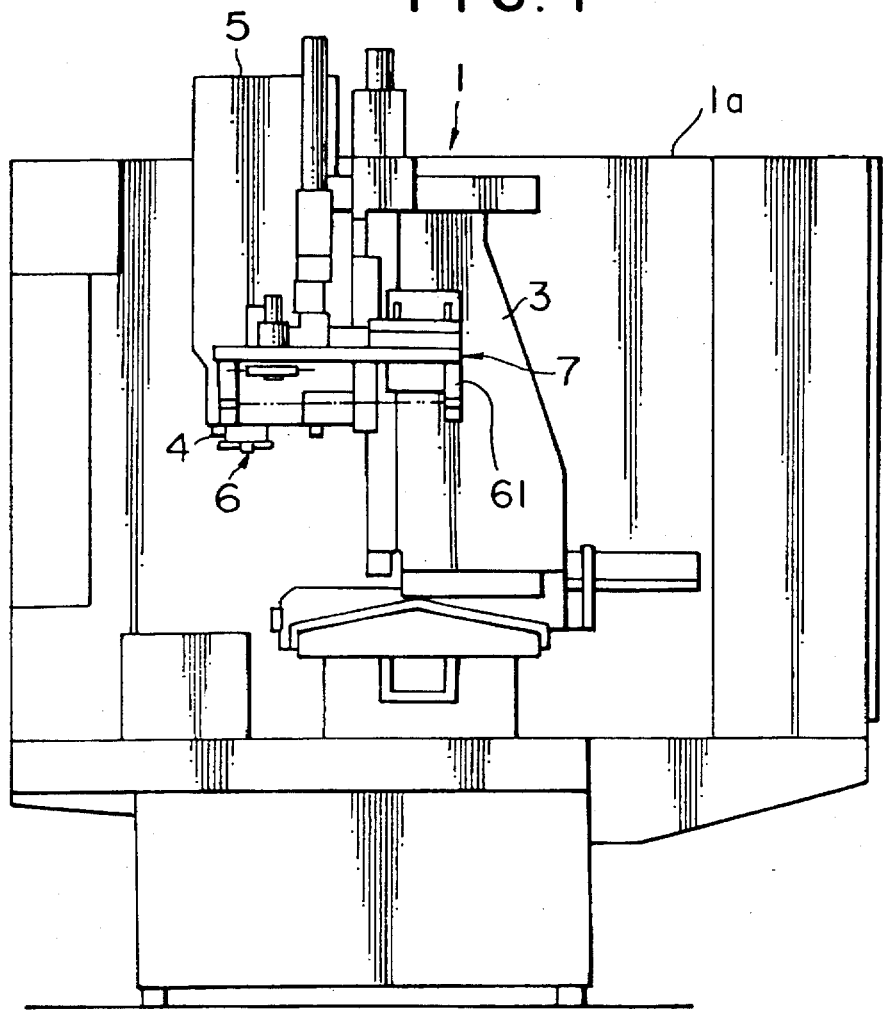
FIG. 2 is a side view of the machining center of FIG. 1.
Figure 4:
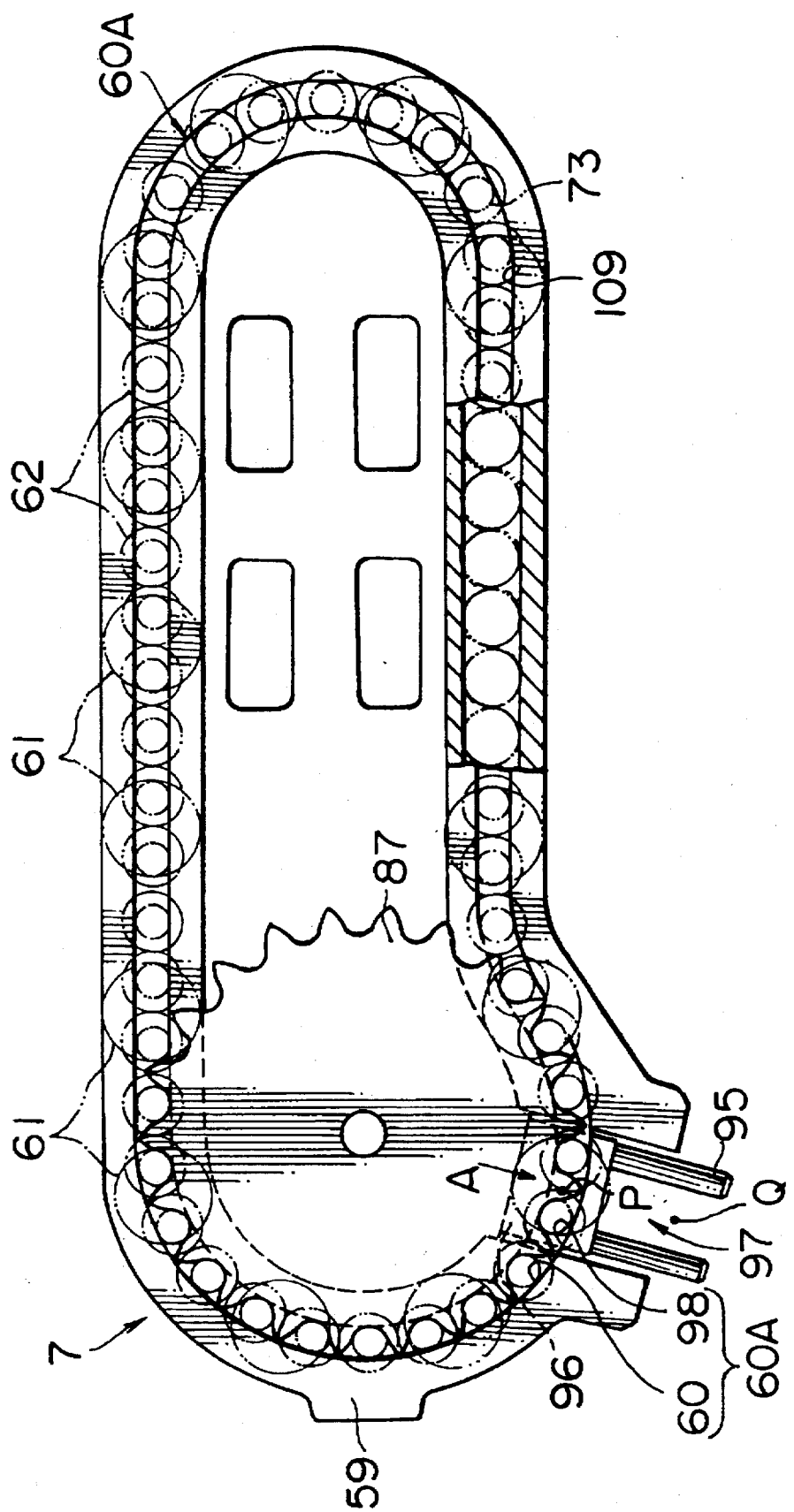
FIG. 4 is a bottom view of the tool magazine of FIG. 3.

A tool magazine in a preferred embodiment of the present invention will be described as applied to a vertical machining center 1. Referring to FIGS. 1 and 2, the machining center 1 has a main frame 1a, a column 3 supported for movement in longitudinal and transverse directions in a horizontal plane on the main frame 1a, and a headstock 5 supported for vertical sliding movement, i.e., movement along the axis of a spindle 4, on the column 3. A tool changing device 6 is disposed near the spindle supported in vertical attitude in the headstock 5. A tool magazine 7 is provided beside the column 3. As shown in FIG. 4, the tool magazine 7 suspendingly supports a plurality of tool pots 61 (sixteen tool ports in this embodiment) and a plurality of idlers 62 (sixteen idlers in this embodiment). The tool magazine 7 positions each tool pot 61 holding a desired tool T (FIG. 10) at an indexed position or a standby position P, and the tool changing device 6 replaces a tool T mounted on the spindle with the desired tool T when the headstock 5 is elevated at a position corresponding to a tool change position Q. The tool changing device 6 may be of any suitable type, such as a tool changing device of a double-arm swing type provided with two swing arms each capable of swinging in an angular range of 180°. Refer to JP-A-63-52945 for further details.

Figure 3:
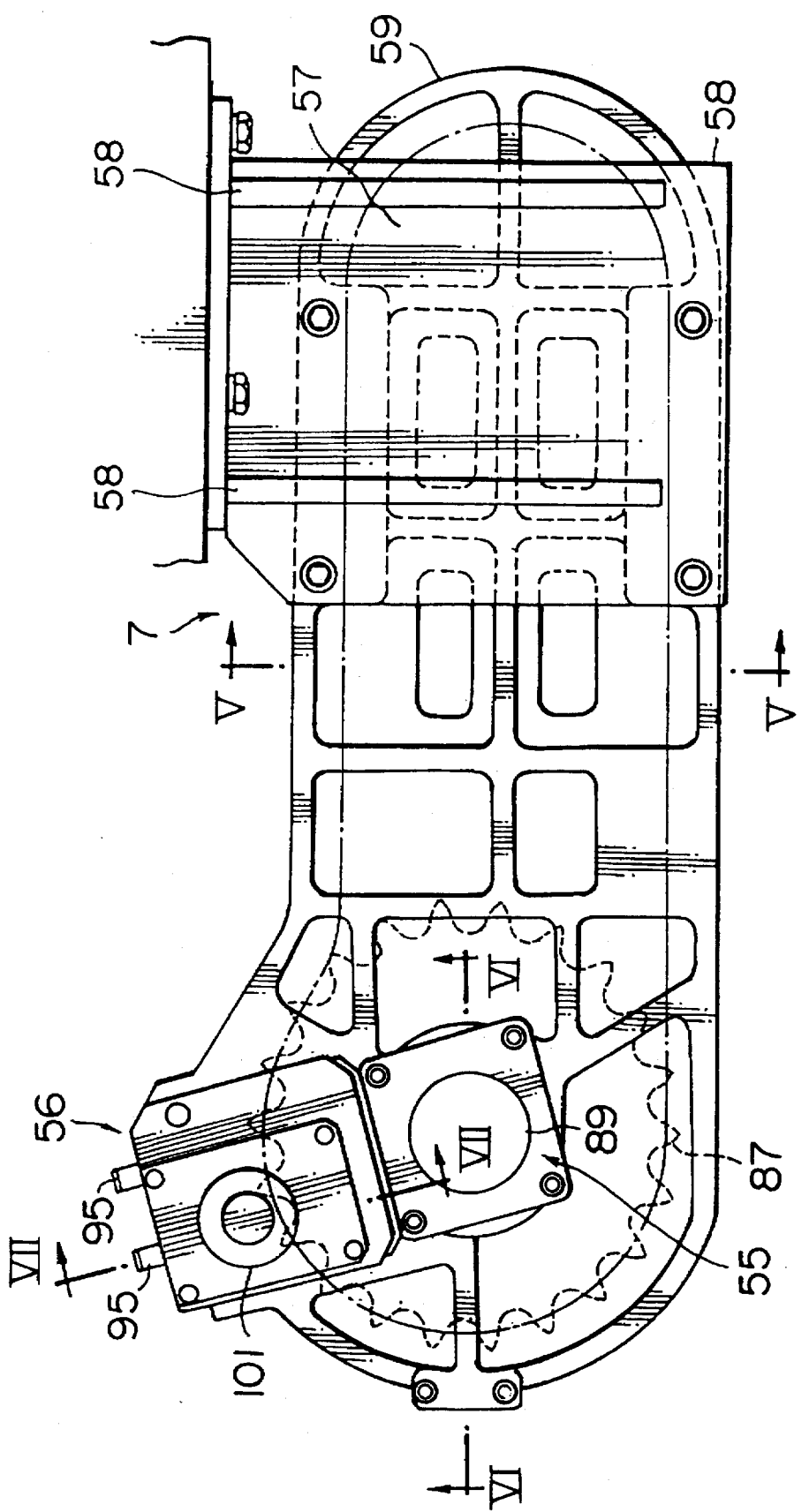
FIG. 3 is a plan view of a tool magazine according to a preferred embodiment of the present invention.
Figure 5:
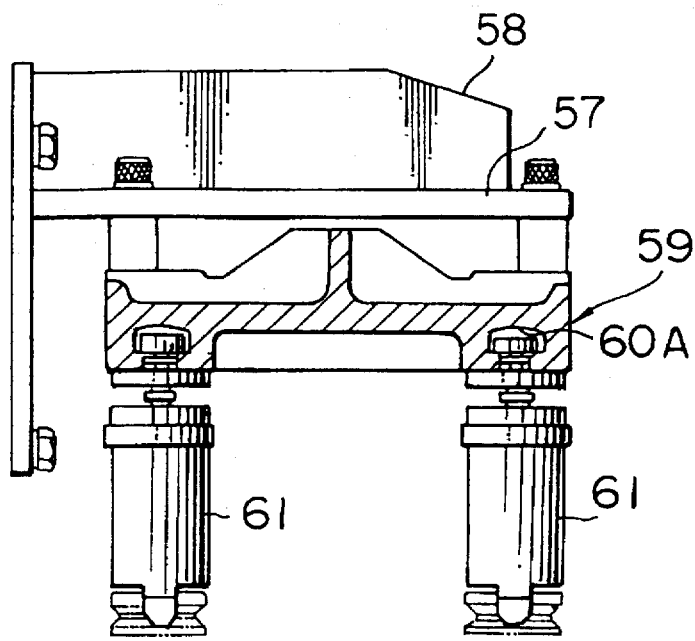
FIG. 5 is a sectional view taken on line V—V in FIG. 3.
Figure 10:
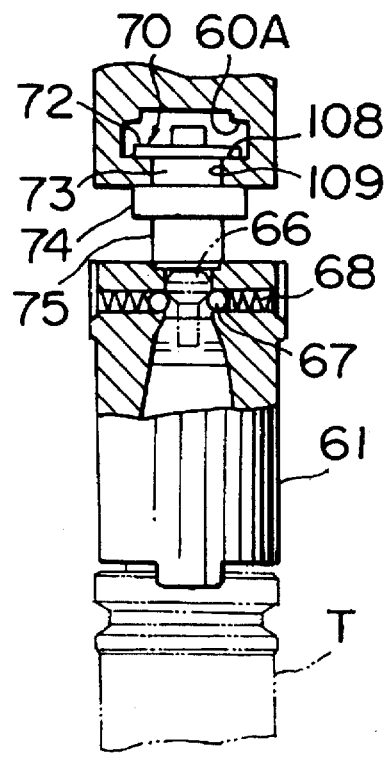
FIG. 10 is a sectional view taken on line X—X in FIG. 8.

FIGS. 3 to 7 show the tool magazine 7 that is substantially the same in fundamental construction as a tool magazine proposed in JP-A-6-246572. As shown in FIGS. 3 and 5, a magazine body 59 has a base end fastened to a mounting plate 57 fastened to a bracket 58 attached to the side surface of the column 3, and a feed mechanism 55 and a pot extracting mechanism 56 are fixedly mounted on the magazine body 59. As shown in FIG. 4, a noncircular first guide groove 60 is formed along the periphery of the lower surface of the magazine body 59. The first guide groove 60 is continuous but is interrupted only at a cutout portion 97. A slider 9, which is shiftable in the direction of arrow A and formed with a second guide groove 98, is fitted in the cutout portion 97 to form an endless guide groove 60A together with the first guide groove 60. As shown in FIG. 10, each of the first guide groove 60 and the second guide groove 98 has horizontal guide surfaces 108 and vertical guide surfaces 109. The tool pots 61 and the idlers 62 are arranged alternately in the guide groove 60A and supported for movement along the guide groove 60A. Each tool pot 61 and the adjacent idler 62 are contiguous or in contact with each other.

Figure 8:
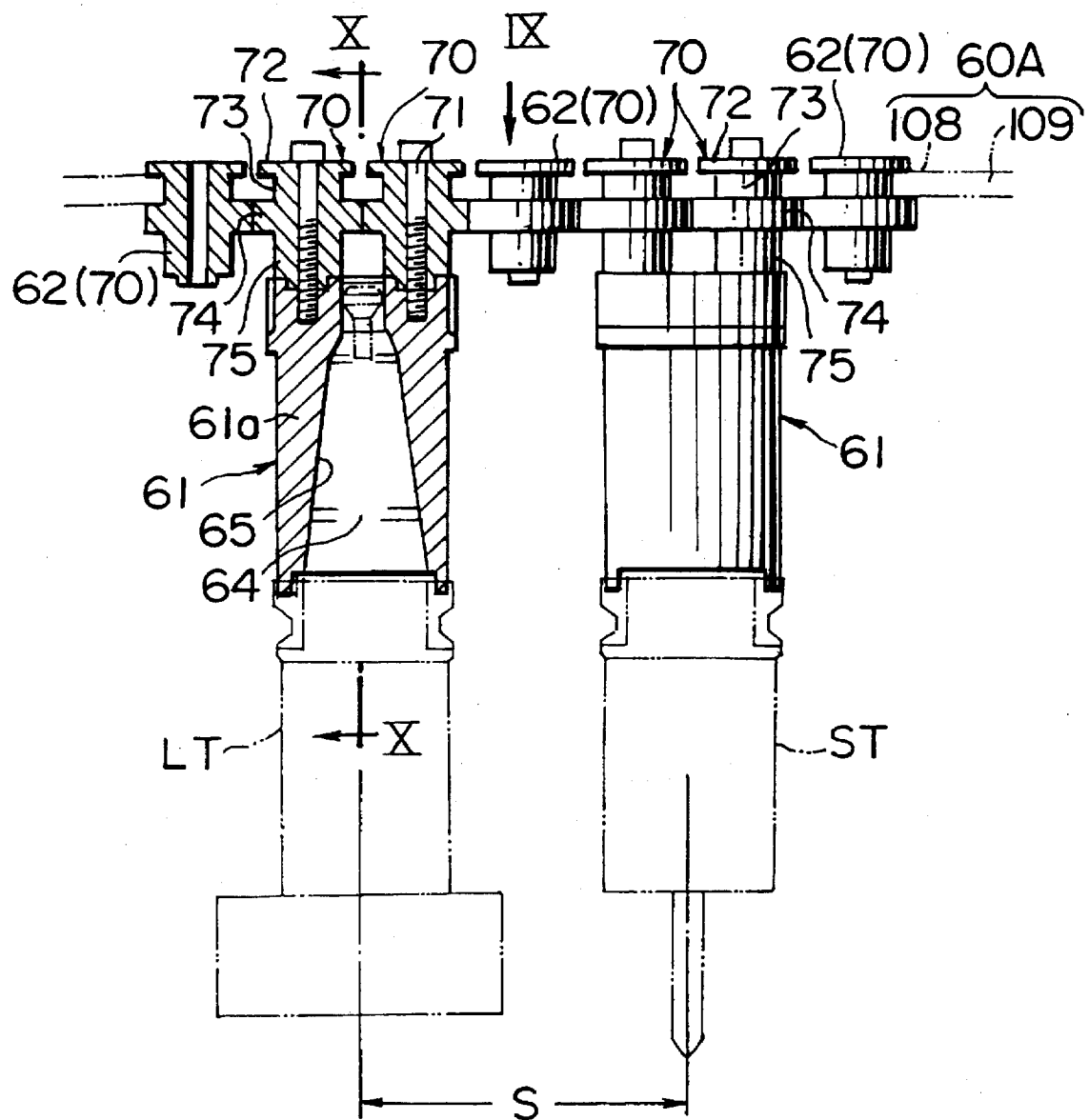
FIG. 8 is a partly sectional side view of a tool pot and an idler.
Figure 9:
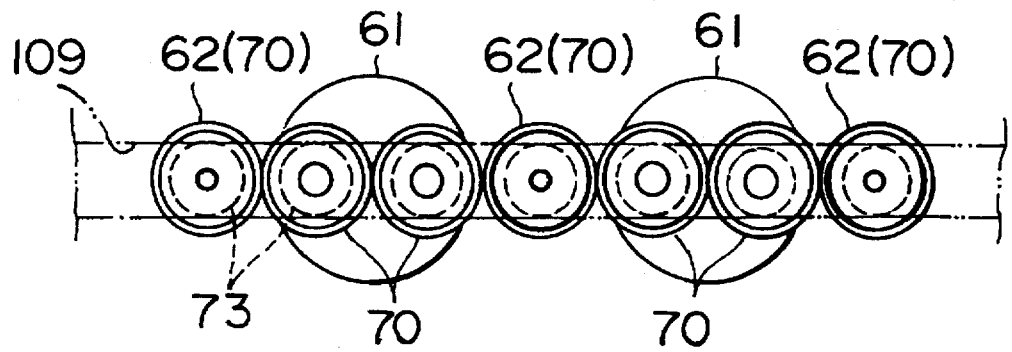
FIG. 9 is a view taken in the direction of the arrow IX in FIG. 8.

The tool pot 61 and the idler 62 will be described with reference to FIGS. 8, 9 and 10. The tool pot 61 has a pot body 61a provided with a tapered hole 65 for receiving the tapered shank of a tool T, balls 67 and springs 68. The springs 68 urge the balls 67 into engagement with the pull stud 66 of the tool T to hold the tool T on the pot body 61a. A pair of guide members 70 are fastened to the upper surface of the pot body 61a in an upright attitude with screws 71. Each guide member 70 has a circular head portion 72, a guided portion 73, a contact portion 74 and an engagement portion 75. The surface of the guide member 70 is coated with a nickel film containing fine particles of oxides, carbides and metals, such as BN, SiC, $Al_2O_3$ and such, and formed by electroless plating. The nickel film containing such fine particles improves the abrasion resistance and the sliding property of the guide member 70. For example, the surface of the guide member 70 coated with a nickel film containing fine BN particles and formed by electroless plating has a hardness in the range of HV 450 to 500 and a coefficient of dynamic friction of 0.05 or below.

The head portion 72 of the guide member 70 of the tool pot 61 is seated on the horizontal guide surfaces 108 of the guide groove 60A to suspend the tool pot 61 from the magazine body 59. The guided portion 73 of the guide member 70 is in sliding contact with the vertical guide surfaces 109 of the guide groove 60A so that the tool pot 61 is able to slide along the guide groove 60A. It is important that the idler 62 is identical in construction with the guide member 70. All the tool pots 61 and all the idlers 62 are arranged alternately on the magazine body 59 with the support members 70 of the tool pots 61 and the idlers 62 inserted in the guide groove 60A and the contact portions 74 of the adjacent guide members 70 and the idlers 62 in contact with each other as indicated in FIG. 9. Accordingly, the tool pots 61 are arranged at a pitch S (FIG. 8), which is large enough for each tool pot 61 to hold a large tool LT of a diameter, for example, 75 mm, greater than that of the pot bodies 61a of the tool pots 61. The engagement portions 75 engages with a sprocket 87 (FIG. 3) included in the feed mechanism 55.

Figure 6:
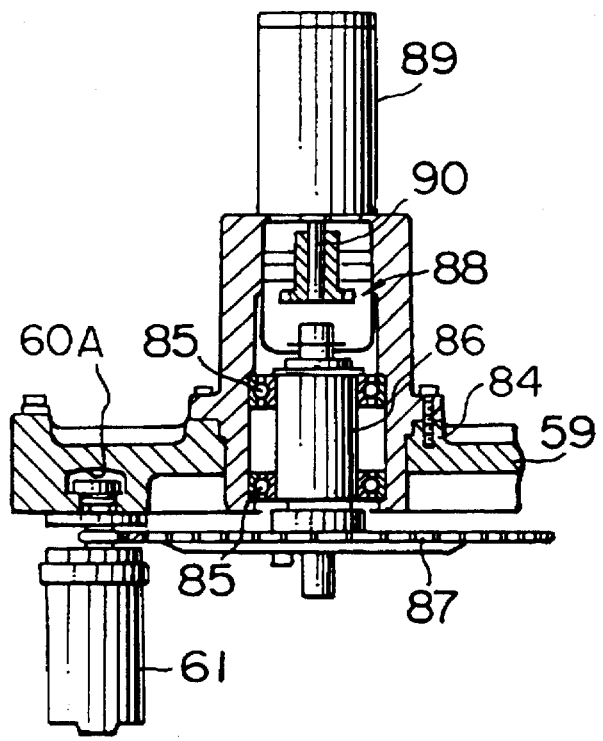
FIG. 6 is a sectional view taken on line VI—VI in FIG. 3.

Referring to FIG. 6, the feed mechanism 55 has a shaft 86 supported for rotation in bearings 85 on a boss 84 of the magazine body 59, the sprocket 87 fixedly mounted on the lower end of the shaft 86, a reduction gear 88 and a reversible indexing motor 89 having a drive shaft 90. The reduction gear 88 has an output shaft coupled with the shaft 86, and an input shaft coupled with the drive shaft 90 of the indexing motor 89. The indexing motor 89 drives the sprocket 87 for rotation to drive the tool pots 61 and the idlers 62 for movement along the guide groove 60A so that the tool pot 61 holding a desired tool T is positioned at the standby position P.

Figure 7:
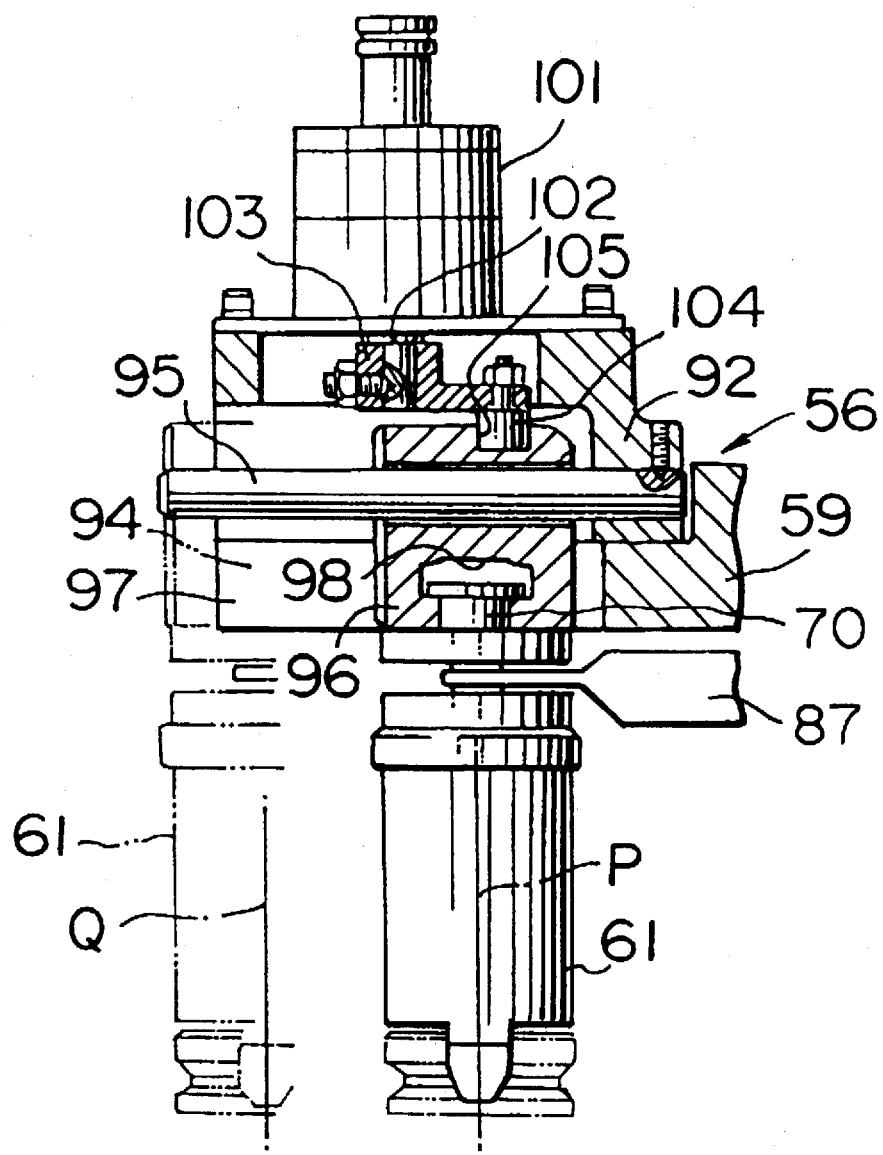
FIG. 7 is a sectional view taken on line VII—VII in FIG. 3.

Referring to FIG. 7, the pot extracting mechanism 56 has a frame 92 fixed to the magazine body 59 and provided with a space 94 opening toward the spindle 4 of the machining center 1. Two guide rods 95 are held so as to extended in a horizontal direction in the space 94 and to project outward from the magazine body 59, and the slider 96 is supported on the guide rods 95 for sliding movement between the standby position P and a tool change position Q. The lower portion of the slider 96 lies in the cutout portion 97 formed in the lower surface of the magazine body 59 and is provided with the second guide groove 98, which is the same in cross section as the first guide groove 60. When the slider 96 is positioned at the standby position P, the second guide groove 98 is continuous with the first guide groove 60 so that the tool pot 61 can be transferred from the first guide groove 60 to the second guide groove 98. A pot extracting motor 101 is installed on the upper surface of the frame 92, and a swing arm 103 is attached to the output shaft 102 of the pot extracting motor 101. A roller 104 is supported rotatably on the extremity of the swing arm 103 and is fitted in an elongate groove 105 formed in the upper surface of the slider 96. When the swing arm 103 is driven for turning by the pot extracting motor 101, the roller 104 fitted in the elongate groove 105 shifts the slider 96 between the standby position P and the tool change position Q.

The operation of the tool magazine 7 on the machining center 1 will be described below. Tools T necessary for a desired machining operation are put on the tool pots 61, respectively, before starting the machining center 1 for the machining operation. While the tool T chucked on the spindle 4 of the machining center 1 is being used for machining, the tool magazine 7 indexes or positions the tool pot 61 holding the next tool T at the standby position P by rotating the sprocket 87 by the indexing motor 89 to move the tool pots 61 and the idlers 62 along the guide groove 60A with the contact portions 74 of the adjacent tool pots 61 and the idlers 62 in contact with each other. The head portions 72 of the guide members 70 fixed to the tool pot 61, and those of the guide members 70 serving as the idler 62 slide smoothly along the horizontal guide surfaces 108 of the guide groove 60A, and the guide portions 73 of the guide members 70 slide smoothly along the vertical guide surfaces 109 of the guide groove 60A.

Upon the reception of a tool change instruction from a controller, the tool magazine 7 actuates the pot extracting motor 101 to advance the slider 96 holding the tool pot 61 positioned at the standby position P to position the tool pot 61 at the tool change position Q. At the same time, the headstock 5 is raised relative to the column 3 to a position corresponding to the tool change position Q. Then, the tool changing device 6 removes the tool from the spindle 4 and puts the tool T held by the tool pot 61 positioned at the tool change position Q on the spindle 4. Subsequently, the slider 96 is retracted to return the tool pot 61 from the tool change position Q to the standby position P, and the tool magazine 7 carries out the tool indexing operation to position the tool pot 61 holding the next tool T at the standby position P for preparation for the next tool changing operation.

As described before, the tool pots 61 and the idlers 62 are arranged alternately on the magazine body 59 so as to slide along the guide groove 60A with the contact portions 74 of the guide members 70 fixed to the tool pots 61 and those of the guide members 70 adjacent to the guide members 70 fixed to the tool pots 61 and serving as the idlers 62 in contact with each other. Thus the tool magazine 7 of the present invention is fundamentally the same in construction as the aforesaid prior art tool magazine, but the pitch S between the successive tool pots 61 of the former is greater than that of the successive tool pots of the latter. Therefore, the tool magazine 7 of the present invention is able to handle tools T of diameters greater than the diameter of the pot bodies 61a. Since the surface of each guide member 70 is coated with a nickel film formed by electroless plating and containing fine particles to enable the guide members 70 to slide smoothly along the guide groove 60A, the guide member 70 need not be provided with any guide rollers that roll along the guide groove 60A, which contributes to cost reduction. Since the guide member 70 is an integral member having the head portion 72, the guided portion 73, the contact portion 74 and the engagement portion 75, the tool magazine 7 of the present invention needs less parts than the aforesaid prior art tool magazine, which also contributes to cost reduction.

The film for coating the surface of each guide member 70 need not be limited to the nickel film containing fine particles and formed by electroless plating; the surface of each guide member 70 may be coated with any suitable, abrasion-resistant film, provided that the film has a coefficient of dynamic friction of 0.15 or below. For example, the surface of each guide member 70 may be coated with a polytetrafluoroethylene film. The tool magazine 7 may be mounted on a stationary column instead of mounting the same on the movable column 3. The tool magazine 1 may be used in combination with a machine tool other than the vertical machining center 1, such as a horizontal machining center or a boring machine, and may be installed separately from a machine tool.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A tool magazine to be used in combination with a machine tool, said tool magazine comprising:

a magazine body provided with an endless guide groove;

a plurality of tool pots each for holding a tool, fixedly provided with guide members engaging the endless guide groove for sliding movement along the guide groove;

idlers disposed between and in contact with the guide members of the adjacent tool pots, respectively, and supported in the endless guide groove so as to move along the endless guide groove; and a feed mechanism for moving the tool pots and the idlers along the endless guide groove with the idlers in contact with the guide members of the adjacent tool pots, respectively.

2. A tool magazine according to claim 1, wherein the endless guide groove has horizontal guide surfaces and vertical guide surfaces, each tool pot is provided with two guide members each having a head portion in sliding contact with the horizontal guide surfaces of the endless guide groove, a guided portion in sliding contact with the vertical guide surfaces of the endless guide groove, and a contact portion in contact with the contact portions of the adjacent guide members, and the idlers are substantially identical in shape and dimensions with the guide members.

3. A tool magazine according to claim 1, wherein the guide member is an integral member having the head portion, the guided portion and the contact portion, and at least one of the surface of each guide member and that of the guide groove is coated with a film that enables each guide member to slide along the guide groove.

4. A tool magazine according to claim 3, wherein the film on at least one of the surface of each guide member and that of the guide groove comprises a nickel film containing fine particles and formed by electroless plating.

5. A tool magazine according to claim 3, wherein the film on at least one of the surface of the guide member and that of the guide groove comprises a polytetrafluoroethylene film.

\* \* \* \* \*